Aug. 31, 1926.
G. A. BURNHAM
1,597,719
THERMORESPONSIVE DEVICE
Filed April 12, 1922   2 Sheets-Sheet 1
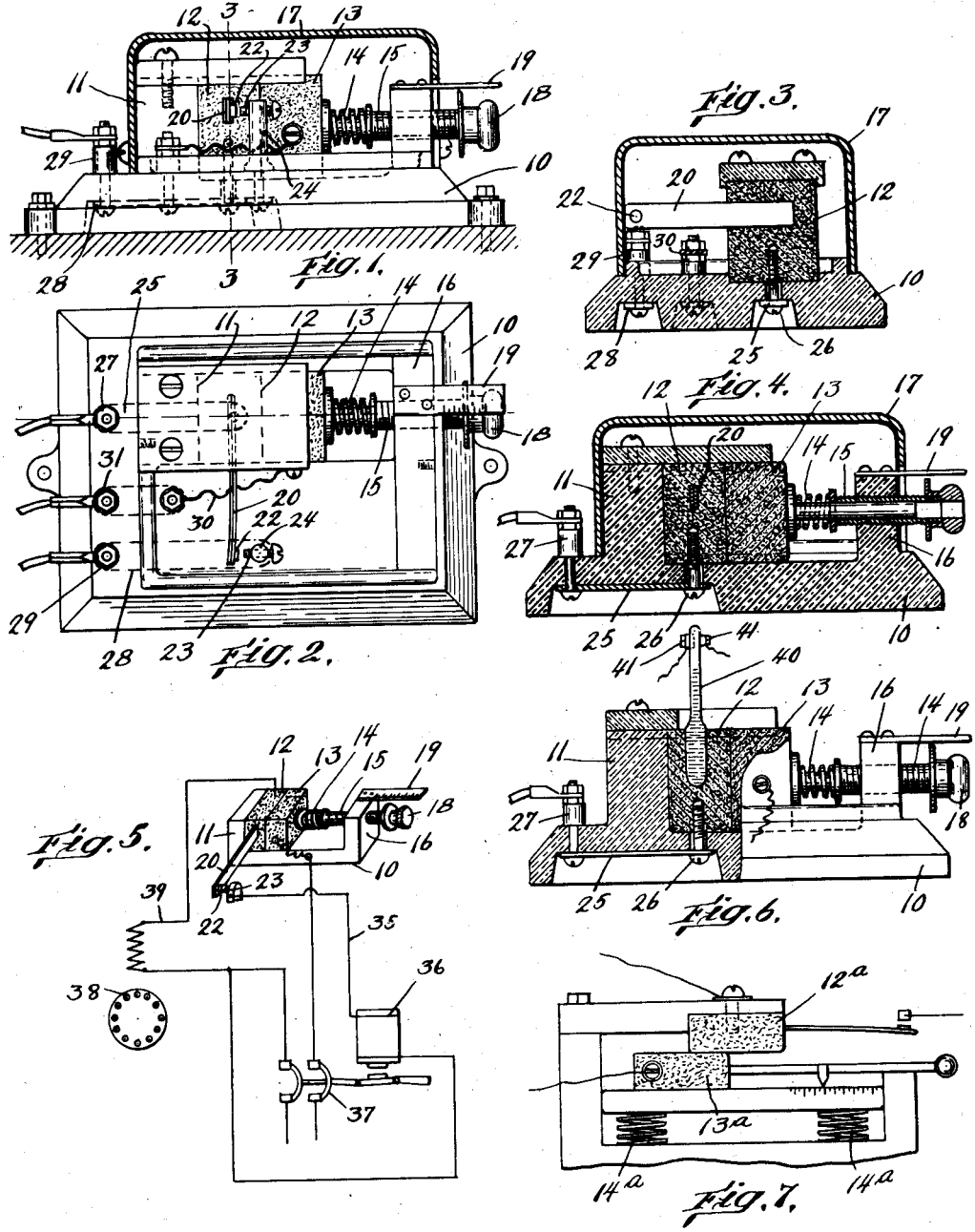
Inventor.
George A. Burnham
by
[signature]
atty Aug. 31, 1926.

G. A. BURNHAM

THERMORESPONSIVE DEVICE

Filed April 12, 1922   2 Sheets-Sheet 2

1,597,719

Inventor,
George A. Burnham
by
atty

Patented Aug. 31, 1926.

1,597,719

UNITED STATES PATENT OFFICE.

GEORGE A. BURNHAM, OF SAUGUS, MASSACHUSETTS, ASSIGNOR, BY MESNE ASSIGNMENTS, TO CONDIT ELECTRICAL MANUFACTURING CORPORATION, OF BOSTON, MASSACHUSETTS, A CORPORATION OF MASSACHUSETTS.

THERMORESPONSIVE DEVICE.

Application filed April 12, 1922. Serial No. 552,028.

This invention relates to thermally-controlled electric circuit controllers and has particular reference to a circuit controller including a thermally responsive element adapted to be heated by the current carried in an electric circuit to control a circuit.

The usual type of thermally controlled circuit controller is usually difficult to adjust to operate on various values of current; for instance, a circuit controller which may operate satisfactorily when influenced by a current of say five amperes, can not be adjusted readily to work satisfactorily for say a current of two amperes, or ten amperes.

An object of this invention is the provision of a thermally controlled circuit controller which can be adjusted for different values of current within a relatively wide range.

The structure embodying the invention may include a thermally influenced member adapted to control a circuit and a heating device actuated by current flowing through it and arranged in heat imparting relation with said thermally influenced member. Said heating member may be adjustable for various values of current whereby operatively to affect the thermal member for any selected value of current within its range.

Fig. 1 is a side view of a thermal circuit controller embodying the invention.

Fig. 2 is a plan view of the controller of Fig. 1 with the cover removed.

Fig. 3 is a transverse section along line 3—3 of Fig. 1.

Fig. 4 is a longitudinal sectional elevation of the controller of Fig. 1.

Fig. 5 is a diagrammatic illustration of the controller connected for the protection of a motor.

Fig. 6 is a side elevation, partially in section, of a modified form of controller.

Fig. 7 is a detail of a further modified form of controller.

Figure 8:
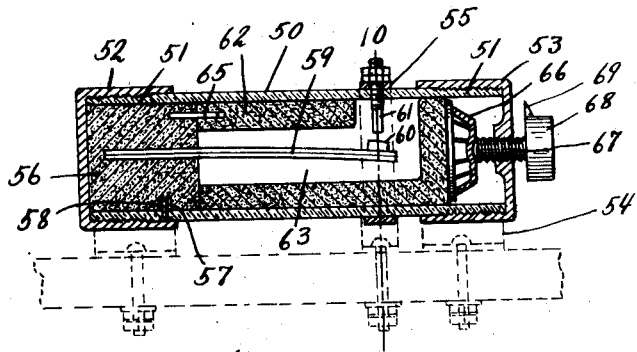
Fig. 8 is a longitudinal sectional elevation of a modified form of controller arranged in a tubular enclosing casing.
Figure 9:
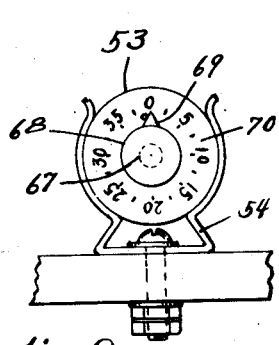
Fig. 9 is an end view of the controller of Fig. 8.
Figure 10:
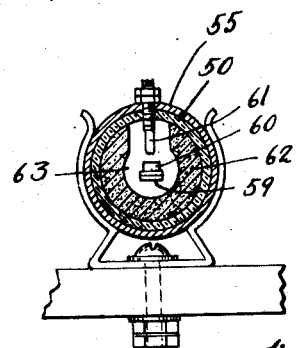
Fig. 10 is a section along line 10—10 of Fig. 8.
Figure 11:
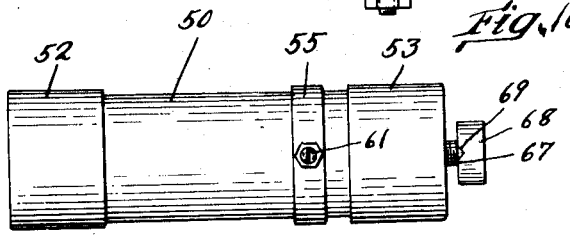
Fig. 11 is a plan view of the controller of Fig. 8.

As here shown, the invention is incorporated in the structure including the supporting member or base 10 having the abutment 11 rising thereabove. Preferably the base and abutment are made of some insulating material as porcelain. The heating element for the thermal element may comprise the two carbon or equivalent blocks 12 and 13 adapted to be supported on the base 10. Said carbon block 12 is adapted to be relatively stationary and is held in position by engagement with the abutment 11 of the base. The other carbon block 13 is adapted to be relatively movable, and is slidable on the base and is adapted to be pressed, with a variable pressure, against the stationary carbon block by suitable means as, for instance, the spring 14 carried by the end of the adjusting screw 15, which latter is threaded into a ledge 16 carried by the base 10. A cover 17 may removably enclose the elements of the controller, and said adjusting screw 15 may extend outwardly beyond said cover and terminate in a knob 18. Rotation of said screw in one direction acts to compress the spring 14 and thereby increases the contact pressure between said carbon blocks, and the value of current at which the thermal element will operate; and rotation in the opposite direction reduces the contact pressure, and the current setting of the controller. A calibration member 19 may be carried by a stationary part of the device and bear calibration indications, as amperes, adapted to register with a part of the knob, to indicate the value of current at which the device is set to operate.

The thermal element 20 may comprise a strip of thermostatic metal comprising two metals having dissimilar expansion coefficients secured together. Said thermal element 20 is carried by and is in heat-receiving relationship with one of the carbon blocks, and preferably the stationary carbon block 12, as by having one end thereof imbedded in said block, and the other end thereof is extended outwardly from said block and bears a contact 22. Said thermal element is adapted to receive heat from the carbon block and expand and flex its outer end toward and away from a, preferably adjustable, contact 23 carried by the stationary post 24, whereby to control an electric circuit including said contact 23 and thermal element.

Said stationary carbon block 12 may be connected electrically, by means of the strap 25 and screw 26, with the binding post 27, and said post 24 may be connected electrically, by means of said strap 28, to a binding post 29.

Said movable carbon block 13 may be connected, by means of the flexible conductor 30, to the binding post 31.

When the device above described is employed for the protection of an electric motor, for instance, I prefer to utilize the thermal element merely to control a control circuit carrying but a small value of current, and to influence the thermal element from the motor circuit by current passed through the heating elements. Accordingly, in Fig. 5, the thermal element 20 is shown in the control circuit 35 including the trip coil 36 of the circuit breaker 37, which latter is in control of the motor 38. The carbon blocks 12 and 13 are placed in the motor circuit 39. When an undue amount of heat is generated in the carbon blocks, as by reason of an overload in the motor circuit, the thermal element is expanded to close the control circuit 35 and open the circuit breaker 37.

The carbon blocks 12 and 13 here comprise the heating elements for the thermal element. The electrical contact at the junction between the blocks is imperfect and current passing through the junction generates heat at the junction which is transmitted through the stationary carbon block to the thermal element and heats said element. When a normal value of current passes through the blocks the heat generated is adapted to be insufficient to effect the operation of the thermal element. When, however, an abnormal amount of current flows through said carbon blocks, the resulting increased heating effect expands the thermal element to effect the control of its circuit.

Said carbon blocks provide means to vary the current value at which the thermal element 20 is effectively operated. By increasing the pressure between said blocks the contact area at the junction is increased and the resistance of the junction is reduced and consequently the amount of heat necessary to operate the thermal element will not be generated until the current passing through the carbon blocks is increased. Consequently, by varying the pressure between the carbon blocks, the current value at which the thermal element will operate, is varied.

In Fig. 6, the thermal element comprises a tube 40 filled with an expansible, electrically conducting, fluid, as mercury. Said tube is received in a recess in the stationary block 12 and the expansible fluid is adapted to expand under heat generated at the junction of said blocks and bridge and electrically connect the contact members 41 and complete the control circuits.

In Fig. 7 the carbon blocks 12$^a$ and 13$^a$ are adapted to be held in engagement at a uniform and invariable pressure by means of the springs 14$^a$ but said block 13$^a$ is adapted to be moved to present a variable area of engagement with said stationary block, whereby to vary the value of current at which the device will operate.

Fig. 8 illustrates a modification of the invention adapting it for use to replace enclosed fuses and to be received in the usual form of use clips.

The tubular enclosing casing 50 of insulating material comprises the supporting member for the device and has the externally screw-threaded end-portions 51 on which the end-caps 52 and 53 are removably screw-threaded. Said end caps are adapted to form the terminals for the motor, or similar, circuit and are adapted to be received removably in the spring fuse clip 54. A third terminal for the controlling circuit including the thermal element comprises the ring 55 disposed on the tubular casing intermediate and insulated from the end caps 52 and 53. A stationary carbon block 56 is received within the tubular casing 50 and is adapted to bear against and make electrical contact with the end cap 52. It may be held in position against rotation by the set screw 57 which may be carried by the casing 50 and enter a recess 58 in said block. A thermal element 59, which may be similar to the thermal element 20 of Fig. 1, is imbedded in said block 56 in heat conducting relationship therewith. Said thermal element is extended substantially axially within the enclosing casing 50 and bears a contact 60 at its free end which is adapted to be moved into and away from electrical engagement with an adjustable contact 61 carried by the ring 55, by the flexing of said thermal element due to the heating thereof, to control the control circuit including said thermal element. A movable carbon block 62 is disposed within said enclosing casing 50 to bear against the stationary block 56; and said movable block may have the passage 63 therein in which the thermal element 59 and the stationary contact 61 are received; and the dimensions of said passage are such that the carbon block is free from electrical contact with the thermal element and stationary contact. Said movable carbon block may be restrained from rotation while in contact with the stationary block 56 by any suitable means as by the pin 65, which may be received in aligned recesses in both blocks. A spring member 66 is disposed to press against the end of said movable block 62 to press it against the stationary block 56 to effect the heating of said latter block; and the pressure may be adjusted by the screw 67 which is adjustably threaded axially in the end cap 53 and bears against said spring member. Said screw 67 may have a knob 68 disposed externally of the casing, by which the screw may be rotated, and a pointer 69 carried thereby may register with indicia 70 on the end wall of the end cap 53 to indicate the current value at which the device is set to operate.

The device illustrated in Fig. 8 is adapted to control a normally open control circuit and the thermal element is adapted to expand and engage the stationary contact 61 to close the controlling circuit.

Figure 12:
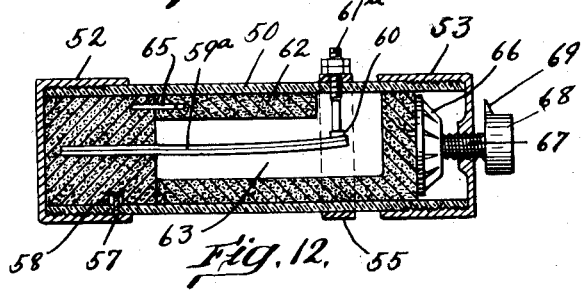
Fig. 12 is a sectional view similar to Fig. 8 but with the thermal element normally in circuit-closing position.

In the modification illustrated in Fig. 12, the device is arranged to control a normally closed control circuit and the thermal element 59ª is arranged normally to engage the stationary contact 61ª and maintain the controlling circuit closed. With an excess amount of current passing through the carbon blocks, with consequent excess heating, the element is arranged to flex and interrupt the control circuit.

The heating element for the thermal element is designed only incidentally to vary the current in the circuit including said element.

The heating elements may be other than contacting carbon blocks and the structure may be otherwise modified without departing from the spirit of the invention.

I claim:

1. A thermally responsive circuit controller including an electrical heating resistance, a thermally-responsive, circuit-controlling element influenced by the heating of said resistance to operate to control its circuit, and means to govern the circuit-controlling operation of said element including means to vary the heating effect of said resistance on said element.

2. A thermally responsive circuit controller including an electrical heating resistance, a thermally-responsive, circuit-controlling element influenced by the heating of said resistance to operate to control its circuit, and means to govern the circuit-controlling operation of said element including means to vary the electrical conductivity of said resistance.

3. A thermally responsive circuit controller including a thermally responsive element, a single electrical heating device for said element, and means to vary the heating effect of said heating device upon said thermally responsive element comprising means to vary the effective cross-sectional area of said electrical heating device to the passage of an electric circuit.

4. A thermally responsive circuit controller comprising a thermally responsive element adapted to control a circuit, and heating means adapted to be influenced by an electric circuit to heat said thermally responsive element, said heating means including two co-acting members having a variable resistance contact between them with pressure-means to vary the contact resistance.

5. A thermally responsive circuit controller comprising a thermally responsive element adapted to control a circuit, and an adjustable electrical contact resistance arranged in heat influencing relation with said element including means to adjust said contact resistance while maintaining the circuit through it, whereby to effect the operation of said thermally responsive element at predetermined values of current flowing through said resistance.

6. A thermally responsive circuit controller comprising a thermally responsive element adapted to control a circuit, and electrical heating means for said element comprising two heating blocks disposed in electrical contact and in heat influencing relation with said thermally responsive element and arranged to be traversed in series by an electric current, whereby to become heated at their point of contact.

7. A thermally responsive circuit controller comprising a thermally responsive element adapted to control a circuit, and electrical heating means for said element comprising two heating blocks disposed in electrical contact and in heat influencing relation with said thermally responsive element and arranged to be traversed in series by an electric current, and means to vary the contact pressure between said blocks.

8. A thermally responsive circuit controller comprising a thermally responsive element adapted to control a circuit, and electrical heating means for said element comprising two heating blocks disposed in electrical contact and in heat influencing relation with said thermally responsive element and arranged to be traversed in series by an electric current, and means to vary the area of contact between said blocks.

9. A thermally responsive circuit controller comprising a thermally responsive element adapted to control a circuit and electrical heating means for said element comprising two heating blocks disposed in electrical contact and arranged to be traversed in series by an electric circuit and adapted to be heated due to the contact resistance therebetween, said thermally responsive element arranged in heat receiving relation with one of said blocks.

10. A thermally responsive circuit controller comprising a thermally responsive element adapted to control a circuit and electrical heating means for said element comprising two heating blocks disposed in electrical contact and arranged to be traversed in series by an electric circuit and adapted to be heated due to the contact resistance therebetween, said thermally responsive element arranged in heat receiving relation with one of said blocks and means to vary the contact pressure between said blocks.

11. A thermally responsive circuit controller comprising a carbon block, a thermally responsive element arranged in heat-receiving relation with said block, and means to heat said block including a second carbon block in electrical contact with said first block, and means to pass an electric current between said blocks including circuit terminals electrically connected with said bocks.

12. A thermally responsive circuit controller comprising a carbon block, a thermally responsive element arranged in heat-receiving relation with said block, and means to heat said block including a second carbon block in electrical contact with said first block, means to pass an electric current between said blocks including circuit terminals electrically connected with said blocks, and means to vary the effective area of contact between said blocks.

13. A thermally responsive circuit controller comprising a carbon block, a thermally responsive element arranged in heat-receiving relation with said block, and means to heat said block including a second carbon block in electrical contact with said first block, means to pass an electric current between said blocks including circuit terminals electrically connected with said blocks, and means to vary the contact pressure between said blocks.

14. A thermally responsive circuit controller comprising a carbon block, a thermally responsive element imbedded in said block, and means to heat said block including a second carbon block in electrical contact with said first block, and means to pass an electric current through said blocks in series including circuit terminals electrically connected with said blocks.

15. A thermally responsive circuit controller comprising a carbon block, a thermally responsive element imbedded in said block, and means to heat said block including a second carbon block in electrical contact with said first block, means to pass an electric current through said blocks including circuit terminals electrically connected with said blocks and means to vary the effective area of contact between said blocks.

16. A thermally responsive circuit controller comprising a supporting member having an abutment, a relatively stationary carbon block carried by said supporting member against said abutment, a thermally responsive element carried by and in heat receiving relation with said carbon block, a stationary contact member disposed in operative relation with said element, a relatively movable carbon block carried by said supporting member in contact with said first block, and means to include said blocks in series in an electric circuit.

17. A thermally responsive circuit controller comprising a supporting member having an abutment, a relatively stationary carbon block carried by said supporting member against said abutment, a thermally responsive element carried by and in heat-receiving relation with said carbon block, a stationary contact member disposed in operative relation with said element, a relatively movable carbon block carried by said supporting member in contact with said first block, means to include said blocks in series in an electric circuit and means to vary the contact pressure between said blocks.

18. A thermally responsive circuit controller comprising a tubular enclosing casing of insulating material, metallic end caps removably carried by the ends of said casing, a relatively stationary carbon block disposed within said casing and in electrical engagement with one of said end caps, a thermally responsive element carried by said block within said casing, a relatively movable carbon block disposed within said casing and in contact with said relatively stationary carbon block and in electrical engagement with said other end cap, and a conducting ring carried externally intermediate the ends of said casing having a contact arranged in operative relation with said thermally responsive member.

19. A thermally responsive circuit controller comprising a tubular enclosing casing of insulating material, metallic endcaps removably carried by the ends of said casing, a relatively stationary carbon block disposed within said casing and in electrical engagement with one of said end caps, a thermally responsive element carried by said block within said casing, a relatively movable carbon block disposed within said casing and in contact with said relatively stationary carbon block and in electrical engagement with said other end cap, and a contact carried by said casing intermediate the ends thereof arranged in operative relation with said thermally responsive member.

20. A thermally responsive circuit controller comprising a tubular enclosing casing of insulating material, metallic end caps removably carried by the ends of said casing, a relatively stationary carbon block disposed within said casing and in electrical engagement with one of said end caps, a thermally responsive element carried by said block and within said casing, a relatively movable carbon block disposed within said casing and in contact with said relatively stationary carbon block and in electrical engagement with said other end cap, a contact carried by said casing intermediate the ends thereof arranged in operative relation with said thermally responsive member, and means to adjust the contact pressure between said carbon blocks.

21. A thermally responsive circuit controller comprising a tubular enclosing casing of insulating material, metallic end caps removably carried by the ends of said casing, a relatively stationary carbon block disposed within said casing and in electrical engagement with one of said end caps, a thermally responsive element carried by said block within said casing, a relatively movable carbon block disposed within said casing and in contact with said relatively stationary carbon block and in electrical engagement with said other end cap, a contact carried by said casing intermediate the ends thereof arranged in operative relation with said thermally responsive member, and means to adjust the contact pressure between said carbon blocks, comprising an adjusting screw threaded in one of said end caps and arranged to exert a pressure on said relatively movable carbon block.

22. A thermally responsive circuit controller comprising a tubular enclosing casing of insulating material, metallic end caps removably carried by the ends of said casing, a relatively stationary carbon block disposed within said casing and in electrical engagement with one of said end caps, a thermally responsive element carried by said block within said casing, a relatively movable carbon block disposed within said casing and in contact with said relatively stationary carbon block and in electrical engagement with said other end cap, a contact carried by said casing intermediate the ends thereof arranged in operative relation with said thermally responsive member, and means to adjust the contact pressure between said carbon blocks comprising an adjusting screw threaded in one of said end caps and arranged to exert a pressure on said relatively movable carbon block and a spring member disposed within the casing and interposed between said adjusting screw and relatively movable carbon block.

23. A thermally responsive electric circuit controller comprising a tubular enclosing casing, a thermally-responsive circuit-controlling element disposed within said casing having electrical heating means for it, and adjusting means independent of the circuit through said heating means and disposed externally of the casing arranged to adjust the heating effect of said heating means on said circuit-controlling element.

24. A thermal relay including the combination of a pair of contacting members having a resistance contact-junction which is adapted to be heated due to the passage of an electric current through the contact junction, and a thermal device responsive to such heating.

25. A thermal relay including the combination of a pair of contacting members having a resistance contact-junction which is adapted to be heated due to the passage of an electric current through the contact junction, and an electric circuit controller having means responsive to such heating.

26. A thermal relay including the combination of a pair of contacting members having a resistance contact-junction which is adapted to be heated due to the passage of an electric current through the contact junction, means to vary the resistance of the contact junction and a thermal device responsive to such heating.

In testimony whereof, I have signed my name to this specification.

GEORGE A. BURNHAM.